Dec. 2, 1941.   J. L. ANDERSON   2,265,052
SKELP WELDING APPARATUS
Filed March 16, 1940        4 Sheets-Sheet 1

INVENTOR
JAMES L. ANDERSON
BY
ATTORNEY

Dec. 2, 1941.  J. L. ANDERSON  2,265,052
SKELP WELDING APPARATUS
Filed March 16, 1940  4 Sheets-Sheet 2
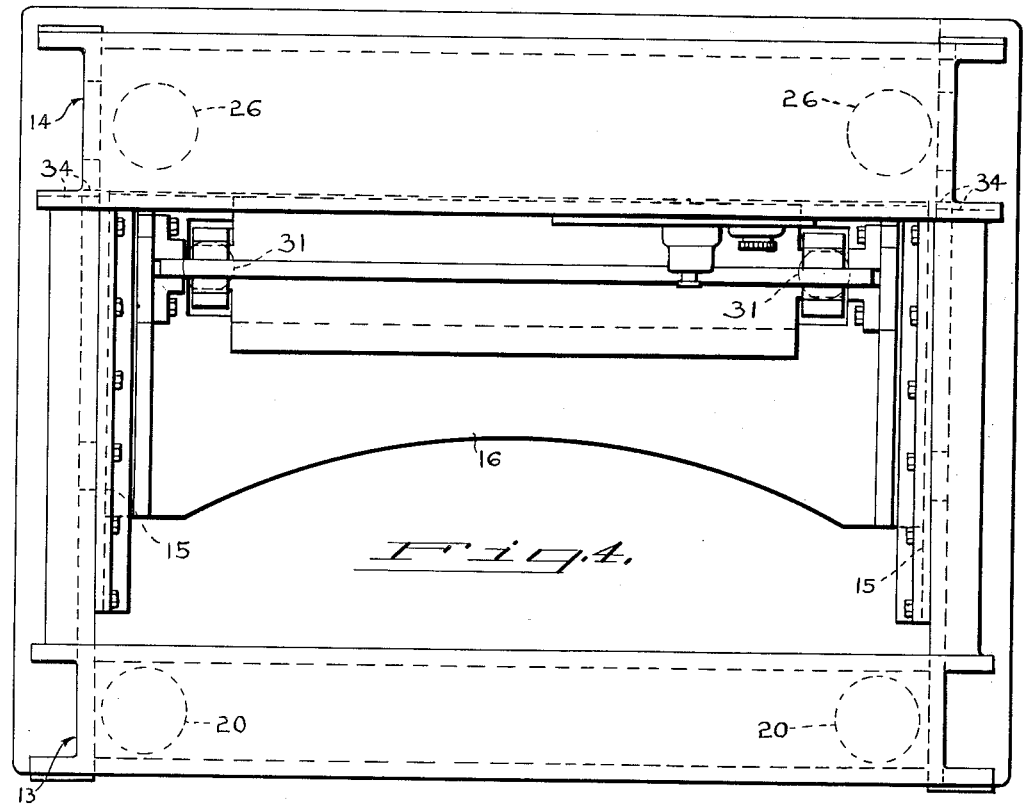
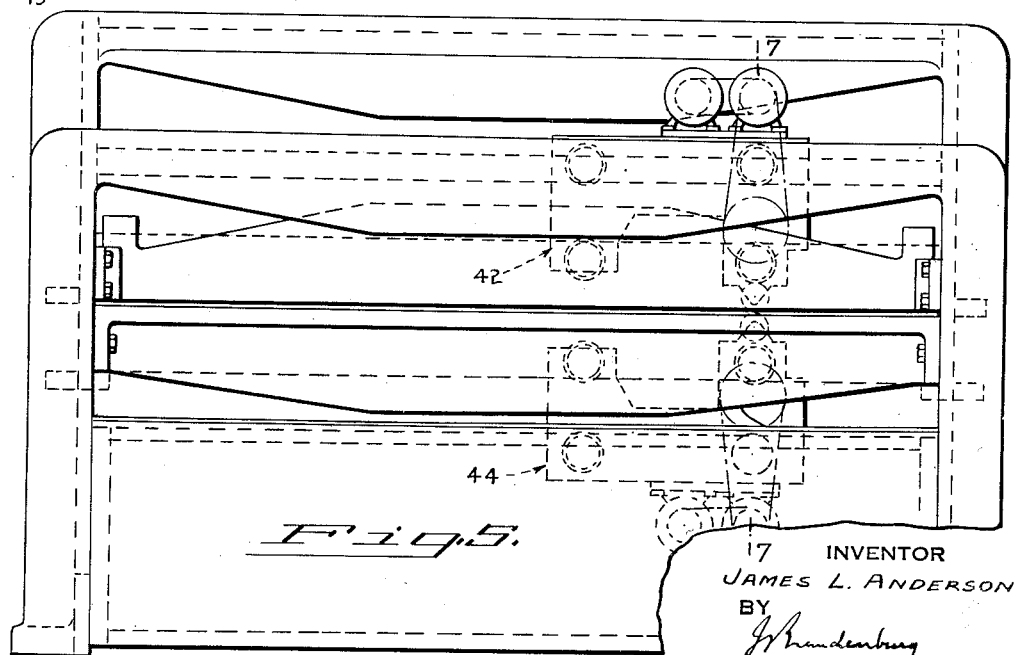
INVENTOR
JAMES L. ANDERSON
BY
ATTORNEY Dec. 2, 1941.                    J. L. ANDERSON                    2,265,052
                              SKELP WELDING APPARATUS
                              Filed March 16, 1940                4 Sheets-Sheet 3

Fig. 6.

INVENTOR
JAMES L. ANDERSON
BY
ATTORNEY

Patented Dec. 2, 1941

2,265,052

UNITED STATES PATENT OFFICE 2,265,052

SKELP WELDING APPARATUS

James L. Anderson, Closter, N. J., assignor to Air Reduction Company, Incorporated, New York, N. Y., a corporation of New York Application March 16, 1940, Serial No. 324,282

16 Claims. (Cl. 29—33)

This invention relates to the welding together of separate lengths of skelp in end-to-end relation to make long lengths suitable for continuous rolling or tube welding operations, or for large coils of the strip material.

It is an object of the invention to provide improved apparatus for positioning and welding the ends of separate lengths of skelp. It is, of course, important that the skelp edges be accurately clamped with their confronting faces in a definite position prior to welding. One feature of the invention relates to a novel combination of apparatus for quickly and conveniently positioning the skelp ends with respect to the clamping means and to each other.

Another object of the invention is to provide improved cross-seam welding apparatus for connecting the ends of two lengths of skelp which are clamped in abutting relation. The invention includes a torch carriage that runs along the same frame to which one of the clamping members is connected and that moves a welding torch located a short distance above the seam. In the preferred embodiment of the invention a similar carriage moves a welding torch along the under side of the seam, and the freshly-made weld is rolled from both sides simultaneously to plate thickness so that the subsequent plate rolling operations will be carried out without a destructive bump being transmitted to the rolling mill. Other features of the invention relate to specific structure of the torch carriages.

Other objects, features and advantages of the invention will appear or be pointed out as the specification proceeds.

In the accompanying drawings, forming part hereof:

Fig. 4 is a top plan view of the apparatus shown in Fig. 3.

Fig. 5 is a left end elevation of the apparatus shown in Fig. 3.

Fig. 6 is an enlarged detail view showing the torch carriages and the relation of the torches and seam rollers to the strip material.

Fig. 7 is a sectional view taken on the line 7—7 of Fig. 6 with parts of the frame and clamps also shown, and Fig. 7 is also an enlarged sectional view on the line 7—7 of Fig. 5.

Figure 1:
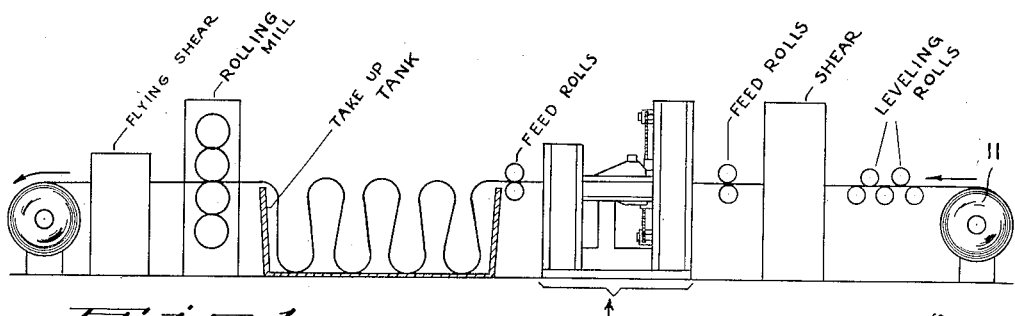
Figs. 1 and 2 are diagrammatic views showing two different combinations in which the invention can be used.

Clamping and welding apparatus 10 is shown in Fig. 1 in an assembly for supplying continuous strip to a rolling mill. The strip material to be rolled is supplied in coils 11, or shorter strips, and fed through leveling rolls to a shear which is operated to cut similar transverse edges at both the front and back ends of the strips, the cuts being preferably at right angles to the longitudinal edges of the strips. Beyond the shear, the strips are advanced by power-driven feed rolls into the clamping and welding apparatus 10, where the front end of each new strip is welded to the rearward end of the strip ahead. The distance from the shear to the clamping and welding apparatus is less than the length of each new strip that is to be connected.

The continuous strip from the welding apparatus 10 is fed by feed rolls into a "take-up tank" in which enough slack is accumulated to permit the rearward end of the strip to be stopped for shearing and welding without interfering with the continuous operation of the rolling mill through which the strip passes after leaving the take-up tank. The rolling mill may include a number of roll stands, depending upon how much the gauge of the strip is to be reduced. The strip may be coiled beyond the rolling mill and a flying shear is used to cut the strip when the coil reaches the desired diameter.

Figure 2:
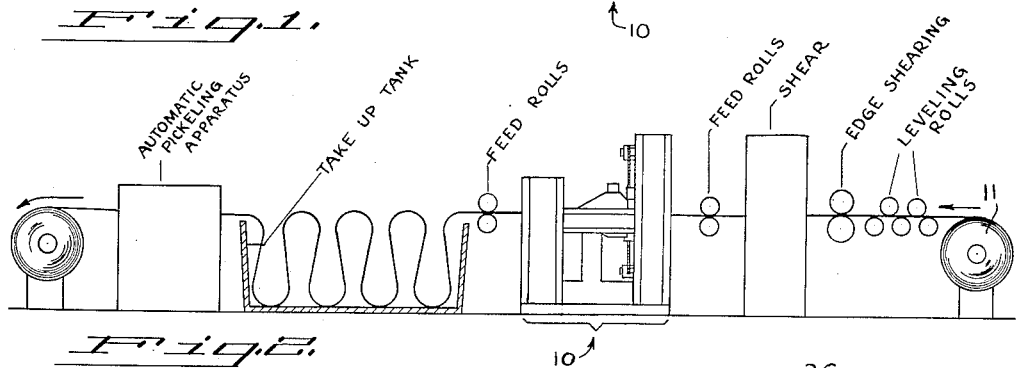

Fig. 2 shows an assembly in which the separate lengths of skelp are initially subjected to an edge-shearing operation and then connected to form a continuous strip and fed through automatic pickling apparatus instead of being fed to a rolling mill as in Fig. 1.

Figure 3:
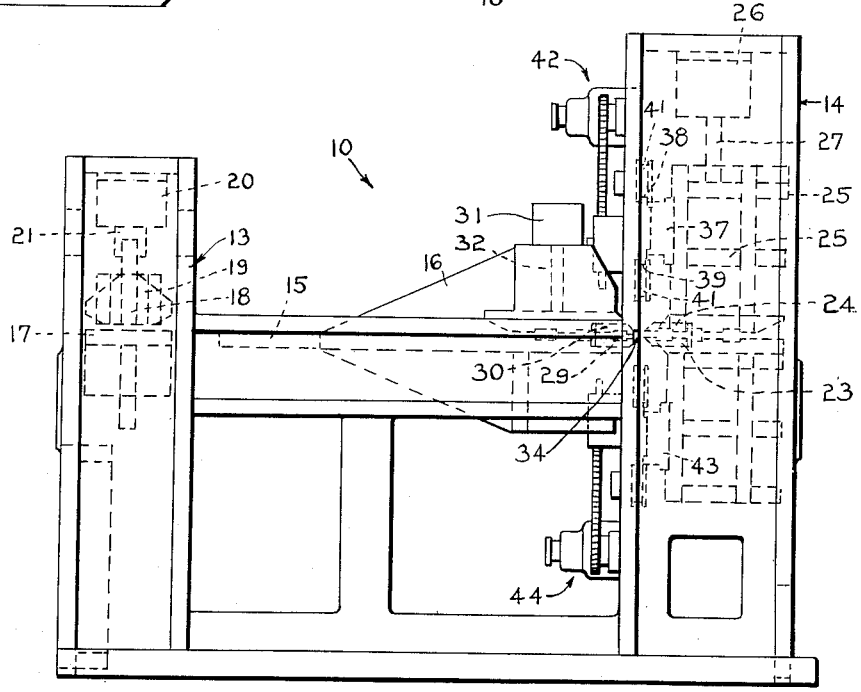
Fig. 3 is an enlarged side elevation of the strip clamping and welding apparatus of this invention shown in Figs. 1 and 2.
Figure 2:
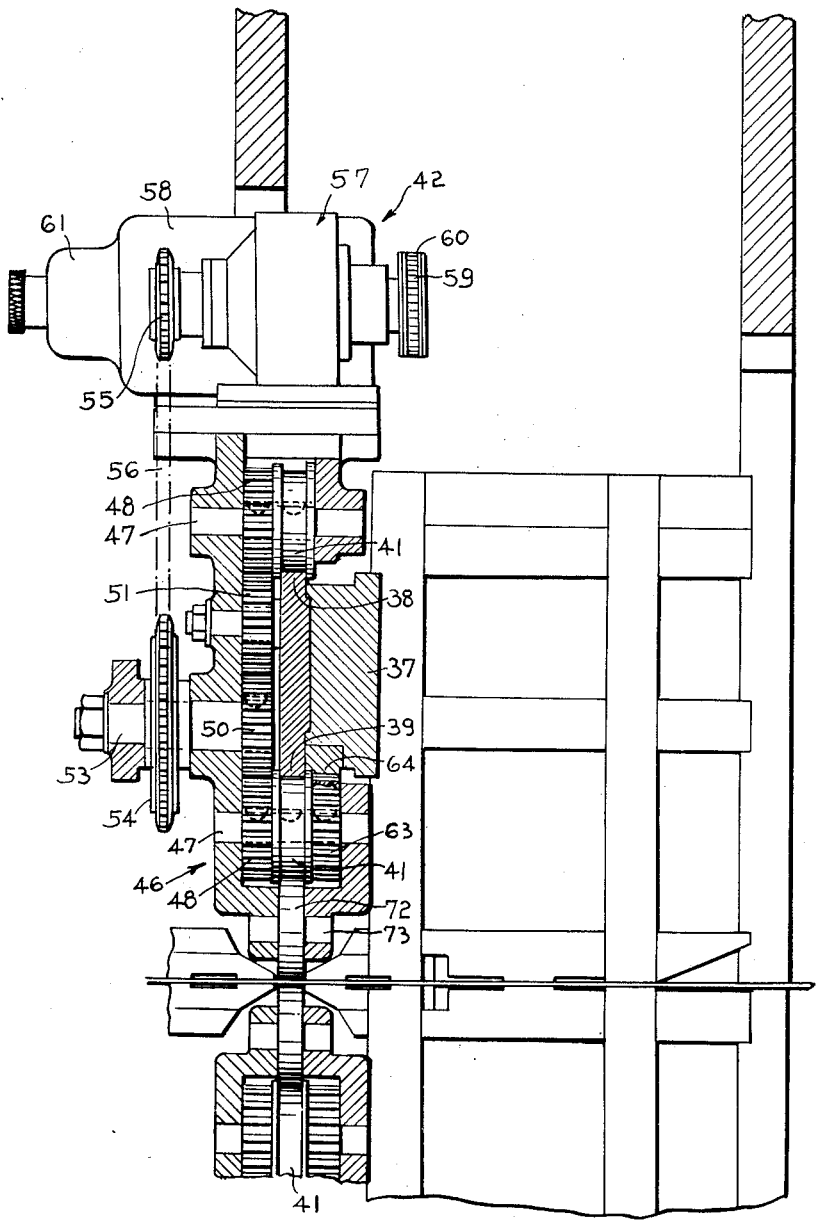

Fig. 3 shows the clamping and welding apparatus 10 which includes a stationary frame made up of end frames 13 and 14 and a connecting structure with guide ways 15 on which a movable frame 16 slides back and forth between the end frames 13, 14.

The left-hand end frame 13 holds a first clamp which comprises a fixed clamping jaw 17 and a movable clamping jaw 18 that slides in guides 19 on the frame 13. The movable clamping jaw 18 is operated by fluid pressure motors including cylinders 20 attached to the top of the frame 13 and piston rods 21 attached to a web of the movable clamping jaw.

The right-hand end frame 14 supports a fixed clamping jaw 23 and has a movable clamping jaw 24 that cooperates with the fixed jaw 23 to hold the end of a new strip during the welding operation. The movable jaw 24 has cross bracing 25 and slides in the frame 14 as a guide. The movable jaw 24 of this second clamp is operated by fluid pressure motors comprising cylinders 26 attached to the frame 14, and piston rods 27 connected to the cross bracing 25.

The apparatus includes a third clamp which is located on the sliding frame 16 and which has a fixed jaw 29 supported by the sliding frame at the level of the fixed jaws 17 and 23 of the clamps on the end frames 13 and 14. A movable clamping jaw 30 is operated by fluid pressure motors, each comprising a cylinder 31 attached to the sliding frame 16 and a piston rod 32 connected with the movable jaw 29. All of the fluid motors are preferably operated by compressed air, but other working fluids can be used.

The frame 14 has openings 34 through which a bar or limit gauge is inserted for initially positioning the front edge of a new strip. When a strip is pushed through the clamp comprising jaws 23 and 24 and into abutment with the bar extending between openings 34, the front end of the strip is correctly positioned with respect to the welding apparatus.

The clamp comprising jaws 17, 18 is used to stop the end of the old strip after the end has passed the clamping jaws 23, 24. After the old strip has been thus stopped and the front end of a new strip has been positioned under the welding apparatus by abutting it against a bar inserted through the openings 34, the bar is removed, the sliding frame 16 is moved along the guide ways 15 to whatever position is necessary to locate the ends of the clamping jaws 29, 30 just back of the edge of the old strip, the clamp 17, 18 is released, and the sliding frame 16 is moved along the guide ways 15 until the rearward end of the old strip comes into abutting relation with the forward end of the new strip.

The end frame 14 has a composite cross member 37 with an upper ridge 38 and a lower ridge 39. These ridges serve as track for grooved wheels 41 of a torch carriage 42. A similar cross member 43 supports a second torch carriage 44 in a location below the clamps for moving a torch along the bottom of the cross seam between the strips to be welded.

Figure 6:
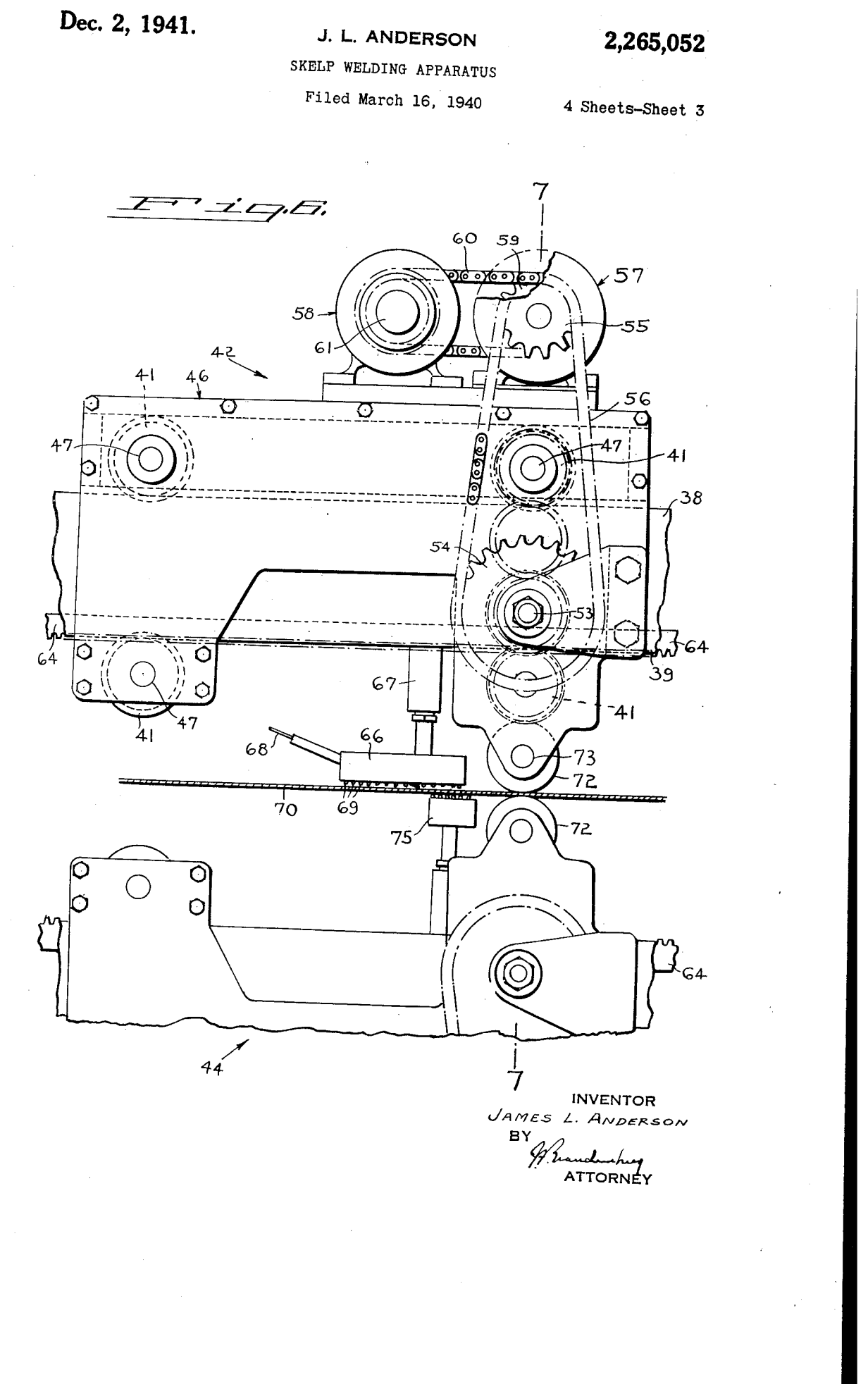

Figs. 6 and 7 show the structure of the upper torch carriage 42. Part of the lower torch carriage 44 is shown also in these views but the construction of both torch carriages is the same and a detailed description of only one carriage is, therefore, sufficient.

The carriage 42 has two grooved wheels 41 running on the upper track 38 and two similar wheels 41 running on the lower track 39. The wheel base of the carriage is long enough to give the carriage stability in the direction in which it moves along the tracks 38, 39, and the flanges on both sides of the grooved wheels 41 on both the upper and lower tracks 38 and 39 give the carriage stability transverse of its direction of movement.

The carriage 42 has a main frame 46 in which are journaled axles 47 of the wheels 41. The wheels 41 are keyed to their axles, and are driven by gears 48 which are keyed to the axles 47. The lower gear 48 is driven directly from a driving gear 50 with which it meshes, but the upper gear 48 is driven through an idler 51 in order to have the upper and lower wheels 41 rotate in directions that cause them to travel the same way along their respective tracks.

The driving gear 50 is keyed to a sprocket shaft 53 and a large sprocket 54 secured to the shaft 53 is driven from a smaller sprocket 55 through a chain 56. The sprocket 55 is at the low-speed end of a reduction gear unit 57 mounted on top of the carriage frame.

A motor 58, also mounted on top of the frame, drives a sprocket 59 on the high-speed side of the reduction gear unit 56 through a sprocket chain 60. The motor 58 is preferably equipped with a centrifugal governor 61 that is adjustable to control the carriage speed in accordance with the gauge of the strips, or other conditions that affect the welding speed.

In order to provide a positive drive instead of relying merely upon the friction of the wheels 41 on the tracks 38 and 39, a rack and pinion drive is used. A pinion 63 (Fig. 7) keyed to the axle 47 has a pitch diameter equal to the diameter of the adjacent wheel 41 and meshes with a rack 64 extending along the bottom of the cross member 37.

A torch tip 66 (Fig. 6) is connected to the bottom of the carriage 42 by a stock 67 through which gas is supplied to the tip. Wire 68 is fed into the weld through an opening through the tip and is melted into the seam in a manner well understood in the art. The welding is preferably done by oxyacetylene flames because of the speed with which welds can be made with such flames, and rapid welding is of importance since the welding period determines the amount of slack that must be accumulated between welding operations. Fig. 6 shows flame jets 69 welding the strip material 70 from right to left.

Close behind the tip 66 there is a roller 72 on an axle 73 that is held in the carriage frame. The roller 72 is located under one of the wheels 41 and extends between the flanges of the wheel 41, as shown in Fig. 7, and into contact with the wheel 41. The diameter of the roller 72 is the same as the diameter of the peripheral surface of the wheel 41 between the flanges. Contact between the roller 72 and the wheel 41, therefore, drives the roller 72 at a speed which causes it to roll along the freshly-made weld at a speed equal to the rate of travel of the carriage 42 along the track 38.

The center distance between the upper and lower wheels 41 is such that the lower wheels contact with the lower track 39 while the upper wheels contact with the upper track 38. The weight of the carriage is, of course, supported by the upper wheels 41. The roller 72 is preferably tangent to the plane of the top surfaces of the abutting strips before the welding operation so that the roller depresses the weld to the level of the original surfaces, but the apparatus can be designed to leave a reinforced weld if desired.

The lower carriage 44 is similar to the upper carriage 42 with the necessary reversals for operating under the strip. Corresponding parts of the two carriages are indicated by the same reference characters. The lower carriage supports a torch tip 75 that is considerably smaller than the upper tip 66 because the function of the lower tip 75 is merely to complete the upper weld and obtain full penetration of the weld section to the full depth of the seam. The lower carriage has a roller 72 for rolling the bottom side of the weld. Since the carriages 42 and 44 have their own motors, it is not essential that they operate at the same time, but economy in time is effected if the carriages 42 and 44 move along the seam together as shown in Fig. 6.

The preferred embodiment of the invention has been illustrated and described, but changes and modifications can be made and some features of the invention can be used without others.

I claim:

1. In apparatus for welding a new length of strip material to an original length which is fed to equipment that operates continuously on endless strip, the combination of a stationary frame, a first clamp at a fixed location on the stationary frame in position to grip and stop the original strip before its rearward end travels beyond said stationary frame, a second clamp at a fixed location on the stationary frame in position to grip a new length of strip material adjacent the forward end of said new length, a movable frame between the first and second clamp and slidable on the stationary frame lengthwise of the strip material, and a clamp on the movable frame in position for gripping the rearward end of the original strip and pulling it back into abutting relation with the forward end of the new strip.

2. In apparatus of the class described, a stationary frame on which are two strip clamps, one for gripping and stopping a traveling original strip and the other for gripping the forward portion of a new strip, a third clamp, and supporting means on which said third clamp is movable lengthwise of the strip lengths for gripping the original strip near its rearward end and moving said rearward end back into abutment with the forward end of the new strip.

3. Apparatus for clamping strips for connection in end-to-end relation including in combination three clamps through which the strip material passes successively, two of said clamps being fixed, and the third clamp between the other clamps and movable back and forth between the others and into substantially abutting relation with at least one of the fixed clamps.

4. Apparatus for positioning strip ends for welding including a first clamp for gripping and stopping the rearward end portion of a long strip, a second clamp through which a new length of strip is inserted, a limit gauge for positioning the forward end of the new strip in a definite relation with respect to the second clamp, means for causing said second clamp to grip the new strip, a third clamp located between the other clamps, and supporting means on which said third clamp is movable back and forth between said other clamps for gripping the rearward portion of the long strip and pulling it back into abutting relation with the end of a new strip gripped in the second clamp.

5. Apparatus for connecting additional lengths of strip material to a long strip, including in combination means for making a weld transverse of the length of the strips, a first clamp for gripping the long strip after the rearward end of said long strip has passed the welding means, a second clamp under the welding means in position to hold the forward end of a new length of strip in position to be welded, and a third clamp located between the other clamps and movable back and forth between said other clamps for gripping the rearward portion of the long strip and pulling it back into abutting relation with the end of a new strip gripped in the second clamp.

6. Apparatus for connecting additional lengths of strip material to a long strip, including in combination a stationary frame, two strip clamps on said frame, one for gripping and stopping the long strip near the end of said long strip and the other for gripping the forward portion of a new strip, a third clamp between the other clamps, supporting means on the frame along which the third clamp is movable in the direction of the length of the strip, a track on the stationary frame extending transversely of the strip, a carriage supported by and movable along the track, and welding apparatus connected to the carriage for welding the new strip to the end of the long strip.

7. Apparatus for welding new lengths of strip material to the rearward end of a long strip that is supplied to equipment which operates on continuous strip, said apparatus including in combination a stationary frame, three clamps supported by the frame and through which the strip material passes progressively, said clamps including a first clamp at the end of the frame from which the strip material is supplied to said equipment, a second clamp at the other end of the stationary frame, a limit stop movable into position to be struck by a new strip inserted into the second clamp when the forward edge of the new strip is in position to be welded, separate fluid motor means for operating the first and second clamps, a movable frame, guideways on the stationary frame along which the movable frame slides lengthwise of the strip material, a clamp on the movable frame with clamping jaws that come close to the second clamp when the movable frame is moved toward said second clamp to bring the rearward edge of the long strip into abutting relation with the new strip, fluid motors on the movable frame for operating the clamp on that frame, cross members on the stationary frame both above and below the level of strip material in the clamps, a self-propelled torch carriage that runs on the upper cross member as a track, a torch support on the carriage in position to move a torch along the seam between the abutting ends of the strips, another self-propelled torch carriage that runs on the lower cross member as a track, and a torch-holder on the lower torch carriage for moving a torch along the under side of the seam between the abutting ends of the strips.

8. A cross-seam welder for connecting the ends of strip material including in combination clamping means for holding the forward edge of a new strip in abutting relation to the rearward end of the strip to which a new length is to be joined, a support extending transversely of the direction of the seam between the abutting ends to be welded, a self-propelled torch carriage that runs along said support, a torch-holder on the carriage in position to move a torch along the seam as the carriage travels along said support, and a roller connected to the carriage in position to roll the freshly-made weld close behind the torch as the torch progresses along the seam to weld the strip ends together.

9. In apparatus for welding together the ends of strips, a cross member extending transversely of the strips and having both top and bottom track surfaces, torch carriage means supported by and movable along the cross member, wheels on said carriage means for contact with the top and bottom track surfaces of the cross member, and rollers connected with the carriage means in position to roll a weld as said carriage means moves transversely across the strips.

10. A cross-seam welder including a torch carriage, guide means along which the carriage moves in the direction of a seam to be welded, a roller connected with the carriage in position to roll a weld close behind a welding torch held by the carriage, a motor on the carriage, and mechanism operated by the motor for moving the torch carriage along the guide means.

11. In a cross-seam welder, a torch carriage, guide means on which the torch carriage moves lengthwise of the seam, a roller on the carriage for rolling a freshly made weld as the torch carriage moves along a seam, a rack extending lengthwise of the guide means, a pinion on the carriage and in mesh with the rack, a motor and mechanism driven by the motor for rotating the rack to move the torch carriage along the guide means with a positive drive, and a power drive that rotates the seam-rolling roller at a peripheral speed equal to the rate of progress of the torch carriage along said guide means.

12. Apparatus for making continuous strips comprising means for welding the strip material, three clamps through which the strip material passes progressively, a shear located ahead of the clamps in position to cut the end of a long strip before said end reaches the clamps, said clamps including a first clamp located beyond the other two for gripping and stopping the long strip after the sheared end has passed beyond the welding means, a second clamp with jaws that grip a new strip adjacent the forward edge formed by shearing the new strip, and a third clamp that has jaws for gripping the long strip adjacent its rearward edge, the third clamp being movable back and forth between the other clamps for pulling the long strip back into abutting relation with the new strip and in position to be operated upon by the welding means.

13. The combination with apparatus for supplying continuous strip material, of means that advance a strip faster than the supply of continuous strip is needed so that a substantial length of slack strip is accumulated between the strip supply source and equipment to which the continuous strip is delivered, a clamp for gripping the strip to stop the movement of the strip toward the slack accumulation, a second clamp for holding a new length of strip, a third clamp movable into position to grip the rearward end of the stopped strip, and movable after release of the first clamp back toward the second clamp to bring the end of said stopped strip into abutting relation with the forward end of the new length of strip, and means for welding the ends of the strips together while held in abutment by the second and third clamps.

14. Strip treating means through which material is moved as a continuous length, apparatus for welding together separate lengths of strip material to make the continuous strip, power-driven feed rolls between the welding apparatus and the strip-treating means for feeding the strip toward the treating means at a faster rate than the strip is moved through said treating means so as to accumulate a length of slack strip, a clamp for stopping the strip after its end passes the welding apparatus, and another clamp movable back and forth lengthwise of the path of the strip for gripping the end of a strip stopped by the first clamp and for pulling the end of the strip back to the welding apparatus.

15. The combination with feeding means that advance strip material to treating means fast enough to accumulate a supply of slack between the feeding means and the treating means, of welding apparatus, a clamp between the welding apparatus and the feeding means for stopping a strip after its rearward end passes beyond the welding apparatus, a movable clamp between the welding apparatus and the fixed clamp, and guide means on which the movable clamp is slidable lengthwise of the strip material for pulling the strip back from the accumulated slack to bring the rearward edge of the strip into position to be acted upon by the welding apparatus.

16. Apparatus for connecting new lengths to a long strip including in combination a stationary frame, a first clamp at a fixed location on the stationary frame in position to grip and stop the long strip before its rearward end travels beyond said stationary frame, a second clamp at a fixed location on the stationary frame in position to grip a new length of strip material adjacent the forward end of said new length, a movable frame between the first and second clamp and slidable on the stationary frame lengthwise of the strip material, a clamp on the movable frame in position for gripping the rearward end of the original strip and pulling it back into abutting relation with the forward end of the new length of strip gripped in the second clamp, a track extending transversely of the direction of movement of the strip, a carriage supported by and movable along the track, welding apparatus connected to the carriage for welding together the abutting ends of the long strip and new length, and rollers connected with the carriage and in position to roll the weld and smooth the seam close behind the welding apparatus.

JAMES L. ANDERSON.